United States Patent
Shah et al.

(10) Patent No.: US 11,038,684 B2
(45) Date of Patent: Jun. 15, 2021

(54) USER AUTHENTICATION USING A COMPANION DEVICE

(71) Applicant: Microsoft Technology Licensing, LLC, Redmond, WA (US)

(72) Inventors: Samir Vasantbhai Shah, Bellevue, WA (US); Jia Le He, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 219 days.

(21) Appl. No.: 16/131,868

(22) Filed: Sep. 14, 2018

(65) Prior Publication Data
US 2020/0007334 A1    Jan. 2, 2020

Related U.S. Application Data

(60) Provisional application No. 62/691,246, filed on Jun. 28, 2018.

(51) Int. Cl.
H04L 29/06    (2006.01)
H04L 9/32     (2006.01)
(Continued)

(52) U.S. Cl.
CPC .............. *H04L 9/3213* (2013.01); *H04L 9/14* (2013.01); *H04L 9/3073* (2013.01); *H04L 63/0853* (2013.01); *H04W 12/06* (2013.01)

(58) Field of Classification Search
CPC combination set(s) only.
See application file for complete search history.

(56) References Cited

U.S. PATENT DOCUMENTS 8,152,644 B2    4/2012   Kert et al.
8,214,888 B2 *  7/2012   Noe ........................ G06F 21/34
                                                         726/9
(Continued)

FOREIGN PATENT DOCUMENTS

EP    1621238 A1    2/2006
EP    2520999 A1   11/2012
(Continued)

OTHER PUBLICATIONS

"Device Type Detection", Retrieved from: https://web.archive.org/web/20190714152305/https://devforum.roblox.com/t/device-type-detection/26112, Jul. 14, 2019, 08 Pages.
(Continued)

*Primary Examiner* — Mahfuzur Rahman
(74) *Attorney, Agent, or Firm* — Fiala & Weaver P.L.L.C.

(57) ABSTRACT

User authentication techniques that use a companion device associated with a mobile computing device are described. The companion device receives a user authentication request from a user authentication service via the mobile computing device, displays information related to the user authentication request, receives an approval of the user authentication request, and transmits the approval of the user authentication request to the service via the mobile computing device. In one embodiment, after transmitting the approval, the companion device receives a token from the mobile computing device that includes a value obtained from the service, signs the token with a private key of a securely-stored signing key pair and provides the signed token to the service via the mobile computing device. In another embodiment, after the companion device transmits the approval to the mobile computing device, the mobile computing device provides a personal identification code from secure storage to the service.

20 Claims, 10 Drawing Sheets

(51) Int. Cl.
*H04L 9/14* (2006.01)
*H04L 9/30* (2006.01)
*H04W 12/06* (2021.01)

(56) References Cited

U.S. PATENT DOCUMENTS

| | | | | |
|---|---|---|---|---|
| 8,601,555 | B2* | 12/2013 | Qin | G06F 21/105 |
| | | | | 726/6 |
| 8,745,401 | B1* | 6/2014 | Hintz | H04L 9/3271 |
| | | | | 713/176 |
| 8,782,546 | B2 | 7/2014 | Haussila et al. | |
| 8,814,698 | B1 | 8/2014 | Lee | |
| 9,227,141 | B2 | 1/2016 | May et al. | |
| 9,550,113 | B2 | 1/2017 | Kulavik | |
| 9,937,415 | B1 | 4/2018 | Makuch et al. | |
| 9,985,786 | B1 | 5/2018 | Bhabbur et al. | |
| 10,148,640 | B2* | 12/2018 | Desai | G06F 9/544 |
| 2005/0039010 | A1* | 2/2005 | Grove | G06F 21/34 |
| | | | | 713/170 |
| 2008/0248845 | A1 | 10/2008 | Morgan et al. | |
| 2010/0125737 | A1* | 5/2010 | Kang | G06Q 20/12 |
| | | | | 713/176 |
| 2010/0304860 | A1 | 12/2010 | Gault et al. | |
| 2013/0159375 | A1 | 6/2013 | Perry et al. | |
| 2013/0227647 | A1* | 8/2013 | Thomas | H04L 63/08 |
| | | | | 726/3 |
| 2013/0342460 | A1 | 12/2013 | Vincent et al. | |
| 2014/0282878 | A1 | 9/2014 | Ignatchenko et al. | |
| 2015/0304847 | A1* | 10/2015 | Gong | H04W 12/06 |
| | | | | 455/411 |
| 2016/0253651 | A1 | 9/2016 | Park et al. | |
| 2016/0285871 | A1 | 9/2016 | Chathoth et al. | |
| 2016/0337131 | A1* | 11/2016 | de Andrada | H04L 63/0823 |
| 2017/0289617 | A1 | 10/2017 | Song et al. | |
| 2017/0357967 | A1* | 12/2017 | Sykora | G06Q 20/3829 |
| 2018/0001205 | A1 | 1/2018 | Osman et al. | |
| 2018/0139257 | A1 | 5/2018 | Ninoles et al. | |
| 2018/0236361 | A1 | 8/2018 | Ninoles et al. | |
| 2018/0318716 | A1 | 11/2018 | Benedetto | |
| 2018/0350180 | A1* | 12/2018 | Onischuk | G07C 13/00 |
| 2020/0101382 | A1 | 4/2020 | Wheeler et al. | |

FOREIGN PATENT DOCUMENTS

| | | | |
|---|---|---|---|
| KR | 101803535 | B1 * | 11/2017 |
| WO | 2015055014 | A1 | 4/2015 |
| WO | 2018009692 | A1 | 1/2018 |

OTHER PUBLICATIONS

"Kerbalcontroller: A Custom Control Panel for Rocket Game Kerbal Space Program", Retrieved from: https://web.archive.org/web/20180123215806/https://www.instructables.com/id/KerbalController-a-Custom-Control-Panel-for-Rocket/, Jan. 22, 2018, 19 Pages.

Pelegrino, et al., "Creating and Designing Customized and Dynamic Game Interfaces Using Smartphones and Touchscreen", In Proceedings of Brazilian Symposium on Computer Games and Digital Entertainment, Nov. 12, 2014, pp. 133-139.

Pihlajamäki, Eveliina, "From Desktop to Mobile: UI Patterns for User Interface Adaptation in Games", In thesis of University of Tampere, Jun. 2016, 42 Pages.

Torok, et al., "A Mobile Game Controller Adapted to the Gameplay and User's Behavior Using Machine Learning", In Proceedings of the International Conference on Entertainment Computing, Sep. 29, 2015, 15 Pages.

Zaman, et al., "Touchscreens vs. Traditional Controllers in Handheld Gaming", In Proceedings of the International Academic Conference on the Future of Game Design and Technology, May 6, 2010, 8 Pages.

"International Search Report and Written Opinion Issued in PCT Application No. PCT/US2019/039123", dated Oct. 23, 2019, 18 Pages.

"Notice of Allowance Issued in U.S. Appl. No. 16/144,883", dated Sep. 13, 2019, 8 Pages.

"International Search Report and Written Opinion Issued in PCT Application No. PCT/US2019/038359", dated Aug. 21, 2019, 14 Pages.

"Non Final Office Action Issued in U.S. Appl. No. 16/655,439", dated Sep. 21, 2020, 10 Pages.

* cited by examiner

USER AUTHENTICATION USING A COMPANION DEVICE

CROSS-REFERENCE TO RELATED APPLICATIONS

This application claims priority to U.S. Provisional Patent Application No. 62/691,246, filed Jun. 28, 2018 and entitled "Provisioning and Utilizing Secondary Credential on Companion Device," the entirety of which is incorporated by reference herein.

BACKGROUND

Smart phone applications exist that assist a user in gaining access to a resource, such as an online web application or service. In accordance with this technology, the user attempts to access the resource via a primary computing device. As used herein, the term "primary computing device" is used to refer to a computing device that the user will ultimately use to interact with the resource once access thereto has been gained. If it is determined that user authentication is required to access the resource, a user authentication service is invoked. The user authentication service then interacts with the user's smart phone, and the smart phone application executing thereon, to carry out a user authentication process. For example, in response to one or more communications from the user authentication service, the smart phone application may request that the user approve the access, respond to a challenge, or the like, before access can be granted. If the user provides a suitable response via her smart phone application, then the user authentication service will grant the user access to the resource via the primary computing device. The foregoing process relies on the user being able to locate and unlock their smartphone to interact with the smart phone application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for performing user authentication to gain access to a resource by using a companion device associated with a mobile computing device. In accordance with embodiments, a first computing device (e.g., a smart watch or other companion device) includes a secure memory within which is stored a signing key pair that includes a private key and a public key, the public key being registered with a user authentication service that comprises one or more user authentication servers. The first computing device receives a user authentication request from the user authentication service via a second computing device (e.g. a smart phone or other mobile computing device with which the first computing device is paired), where the second computing device is connected to the user authentication service and wirelessly connected to the first computing device. The first computing device displays information related to the user authentication request, receives an approval of the user authentication request, and transmits the approval of the user authentication request to the second computing device. The first computing device further receives a token from the second computing device, where the token comprises a value that was obtained by the second computing device from the user authentication service in response to receiving the approval of the user authentication request, signs the token with the private key to generate a signed token, and provides the signed token to the second computing device for subsequent transmission to the user authentication service. The signed token and the public key are usable by the user authentication service to determine that the user authentication request is to be granted.

In accordance with alternative embodiments, a first computing device (e.g., a smart phone or other mobile computing device) includes a secure memory within which is stored a personal identification code that is registered with a user authentication service that comprises one or more user authentication servers. The first computing device receives a user authentication request from the user authentication service to which the first computing device is connected, transmits the user authentication request to a second computing device to which the first computing device is wirelessly connected (e.g., a smart watch or other companion device that is paired with the first computing device), and receives an approval of the user authentication request form the second computing device. Subsequent to receiving the approval of the user authentication request from the second computing device, the first computing device reads the personal identification code from the secure memory and transmits it to the user authentication service. The personal identification code is usable by the user authentication service to determine that the user authentication request is to be granted.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
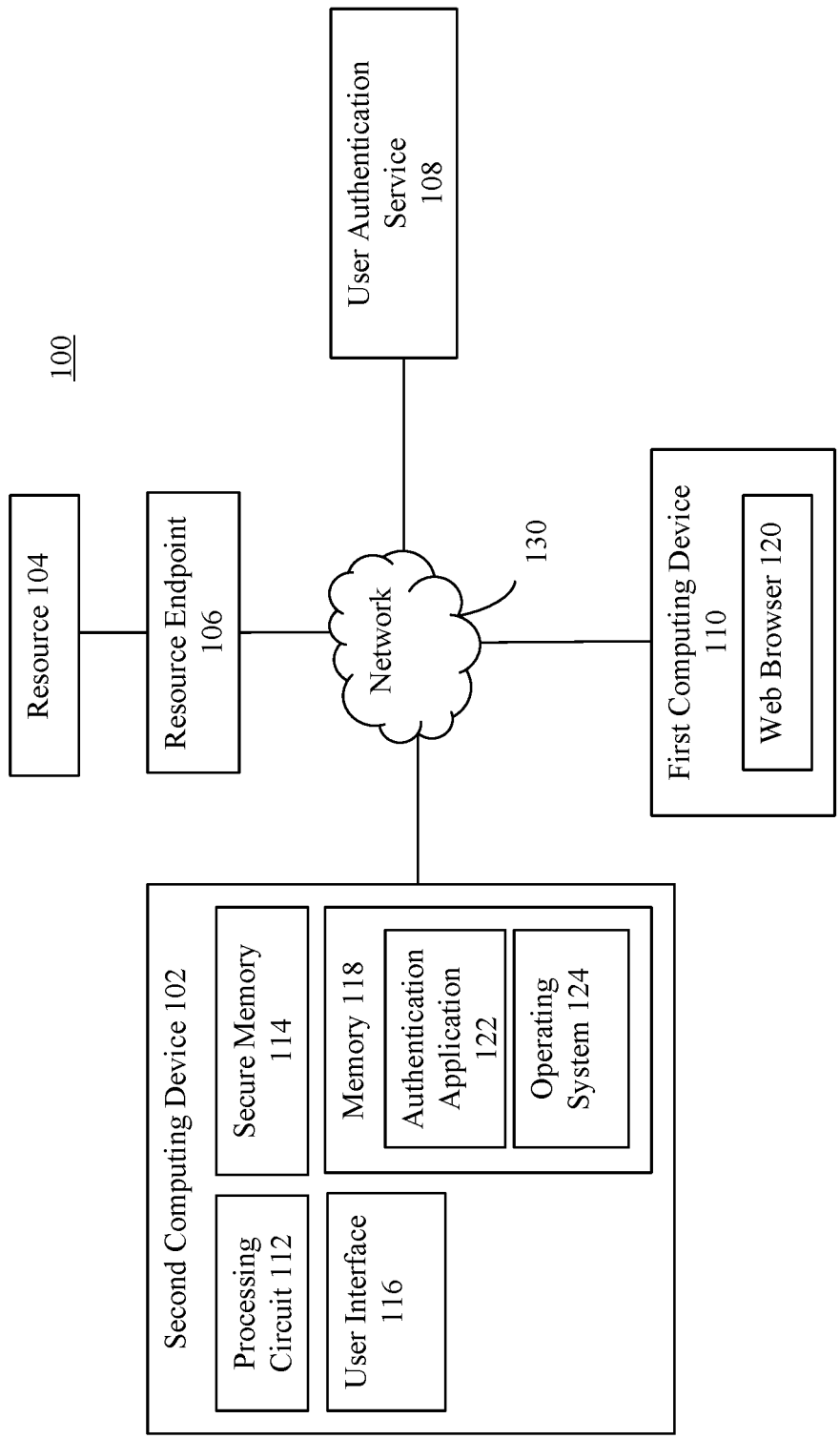
FIG. 1 is a block diagram of an example system that authenticates a user that is seeking to gain access to a resource via her primary computing device in a manner that utilizes the user's mobile computing device.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Example embodiments described herein are directed to techniques for performing user authentication to gain access to a resource by using a companion device that is communicatively connected to a mobile computing device. For example and without limitation, in one scenario the resource may comprise an online web application or service, the mobile computing device may comprise a smart phone, and the companion device may comprise a smart watch that is paired with the smart phone.

As discussed in the Background section above, smart phone applications exist that assist a user in gaining access to a resource via a primary computing device. As used herein, the term "primary computing device" is used to refer to the computing device that the user will ultimately use to interact with the resource once access thereto has been gained. For instance, such applications may enable the user to gain access to the resource using a password-less approach in which the user does not need to enter a password into the primary computing device but instead relies on a credential secured by the smart phone. Alternatively, such applications may enable the user to gain access to the resource using a multi-factor authentication (MFA) user authentication approach in which the user enters a password into the primary computing device to provide a first authentication factor and then one or more additional authentication factors are obtained from the smart phone. In accordance with such approaches, the security of the resource is increased by requiring added interaction with the user's mobile device. Furthermore, the password-less approach makes life easier for users, as they do not have to remember their password to gain access to the resource. This is desirable for numerous reasons including that many passwords are complex and thus difficult for a user to remember. Additionally, since many online applications and services now require passwords and have different rules about what qualifies as an acceptable password, it has become increasingly difficult for a user to remember each of their different passwords.

To help illustrate the foregoing, FIG. 1 will now be described. In particular, FIG. 1 is a block diagram of an example system 100 that authenticates a user that is seeking to gain access to a resource via her primary computing device in a manner that utilizes the user's smart phone. As shown in FIG. 1, system 100 includes a first computing device 110, a second computing device 102, a user authentication service 108, and a resource endpoint 106 that are all communicatively connected via one or more network(s) 130. System 100 further includes a resource 104 that is connected to network(s) 130 via resource endpoint 106.

First computing device 110 is intended to represent a computing device via which the user intends to access resource 104. As discussed above, this computing device may be referred to herein as the "primary computing device." First computing device 110 may comprise, for example and without limitation, a desktop computer, a tablet computer, a laptop computer, a video game console, or the like. As shown in FIG. 1, first computing device 110 includes a web browser 120 that the user may interact with in order to gain access to and ultimately interact with resource 104. Although a web browser 120 is shown in FIG. 1 for the sake of illustration, persons skilled in the art will appreciate that any internet-enabled application may be used to facilitate such interaction.

Second computing device 102 is intended to represent a smart phone or other computing device that is owned by or otherwise associated with the user. This computing device may also be referred to herein as the "secondary computing device." As shown in FIG. 1, second computing device 102 includes a processing circuit 112, a memory 118, a secure memory 114, and a user interface 116. Processing circuit 112 is configured to execute certain computer programs stored in memory 118, including an operating system (OS) 124 and an authentication application 122. As will be discussed below, authentication application 122 is used to assist in a user authentication process that will ultimately enable the user to gain access to resource 104 via first computing device 110. Secure memory 114 is configured to store highly-sensitive information, such as one or more credentials that may be used in the aforementioned user authentication process. Secure memory 114 may comprise, for example, an encrypted database. Such encrypted database may be protected, for example, by an encryption key that is obtained based on information unique to second computing device 102 in combination with a user-defined passcode, although this is only one example. User interface 116 comprises a means by which the user can interact with second computing device 102 and may comprise, in an example in which second computing device 102 is a smart phone, a touch sensitive display and one or more buttons or switches.

Resource 104 is intended to represent a resource that the user wishes to access and to which access is allowed only to authenticated users. Resource 104 may comprise, for example and without limitation, an online web application or service that requires the user to be authenticated prior to obtaining access, although this example is not intended to be limiting. Such online web application or service may be executing on one or more computing devices, as is known in the art.

Network 130 is intended to represent one or more physical links between computing devices or other electronic devices that enable the communication of data therebetween. Network 130 may include any type of network, including but not limited to a local area networks (LAN), wide area network (WAN) such as the Internet, a telecommunication network, or the like. Network 130 may further comprise one or more wired and/or wireless networks. Communication over network 130 may be carried out using any of a wide variety of well-known wired and wireless network communication protocols.

When a user wishes to access resource 104 via first computing device 110, the user may interact with web browser 120 in a well-known manner to cause web browser 120 to send an access request to resource endpoint 106. Resource endpoint 106 comprises one or more computing devices that operate to receive such access requests and to grant or deny access to resource 104 based on whether the user associated with the request is authorized to access resource 104. If user authentication is required to access resource 104, then resource endpoint 106 will invoke user authentication service 108 to authenticate the user prior to determining whether or not to grant or deny access to resource 104. User authentication service 108, which is also implemented on one or more computing devices, may then initiate a user authentication process to authenticate the user in a manner that involves both first computing device 110 and second computing device 102.

One such user authentication process, which may be referred to as a password-less user authentication process, will now be described. In accordance with this process, user authentication service 108 prompts the user, via web browser 120, to either enter a password required for user authentication or to elect to perform user authentication in a manner that does not require entering such a password. If the user elects to perform password-less user authentication, then user authentication service 108 interacts with authentication application 122 executing on second computing device 102 to obtain therefrom a user credential stored in secure memory 114. Upon receipt of this secured user credential, user authentication service 108 may then authorize the user to access resource 104. For example, user authentication service 108 may authorize the user to access resource 104 by sending a suitable access token back to resource endpoint 106. Upon receipt of the access token, resource endpoint 106 then provides the user with access to resource 104 via first computing device 110.

Authentication application 122 may provide the secured user credential to user authentication service 108, for example, by signing a value (e.g., a blob or cryptographic nonce value) provided by user authentication service 108 with a private signing key that is stored in secure memory 114 and then returning the signed value to user authentication service 108. User authentication service 108 can then verify the signed value using a previously-registered public signing key that corresponds to the private signing key. However, this is only one example of a way in which authentication application 122 can provide a user credential to user authentication service 108, and various other user credentials and techniques may be used.

Before providing the user credential to user authentication service 108, authentication application 122 requires the user to authorize the access attempt through some form of interaction with user interface 116 of second computing device 102. For example, the user may be required to indicate via user interface 116 that the access attempt should be allowed. As another example, the user may be required to select a number or code displayed on user interface 116 that is identical to one displayed via web browser 120 of first computing device 110 or provide a response to some other security challenge. Still other means for obtaining user authorization of the access attempt may be used. In an example scenario in which second computing device 102 is a smart phone, the user must be able to find and unlock their smart phone in order to carry out such interaction with user interface 116.

An alternative user authentication process, which may be referred to as a multi-factor authentication (MFA) user authentication process, will now be described. In accordance with this process, user authentication service 108 prompts the user, via web browser 120, to enter a password required for user authentication. The password serves as a first authentication factor. User authentication service 108 then also interacts with authentication application 122 executing on second computing device 102 to obtain therefrom one or more additional authentication factors. In this example, a personal identification code that is stored in secure memory 114 and provided to user authentication service 108 provides an additional authentication factor. Upon receipt of the personal identification code, user authentication service 108 may then authorize the user to access resource 104. For example, user authentication service 108 may authorize the user to access resource 104 by sending a suitable access token back to resource endpoint 106. Upon receipt of the access token, resource endpoint 106 then provides the user with access to resource 104 via first computing device 110.

Authentication application 122 may provide the personal identification code to user authentication service 108, for example, by reading the personal identification code from secure memory 114 and transmitting the personal identification code to user authentication service 108. User authentication service 108 can then compare the personal identification code to a previously-registered personal identification code to make sure that they match.

Before providing the personal identification code to user authentication service 108, authentication application 122 may require the user to authorize the access attempt through some form of interaction with user interface 116 of second computing device 102. For example, the user may be required to select a number or code displayed on user interface 116 that is identical to one displayed via web browser 120 of first computing device 110 or provide a response to some other security challenge. However, this is not intended to be limiting and other means for obtaining user authorization of the access attempt may be used. As also noted above with respect to the password-less approach, in an example scenario in which second computing device 102 is a smart phone, the user must be able to find and unlock their smart phone in order to carry out such interaction with user interface 116.

As previously described, in a scenario in which second computing device 102 is a smart phone, authorization application 122 assists the user in gaining access to the resource via first computing device 110 but requires the user to find and unlock the smart phone in order to interact with authorization application 122. This may be deemed undesirable as a user's smart phone may not be easily located and/or unlocked by the user at the time the user authentication process is taking place. For example, the user's smart phone may be misplaced or otherwise not readily accessible, or the user may be in a situation where finding and unlocking her smart phone is not possible. To address this issue, embodiments described herein enable the user authentication process to be carried out via user interaction with a companion device that is communicatively connected to the smart phone, instead of the smart phone itself. Since the companion device may comprise, for example, a smart watch or other wearable computing device, the user may have better and/or easier access to it. Furthermore, embodiments described herein enable the authentication process to be carried out while the smart phone remains in a locked state, which means that the user does not need to find and/or unlock the smart phone to complete the user authentication process.

As will also be discussed herein, embodiments described herein rely on wireless communication between a mobile computing device, such as a smart phone, and a companion device, such as a smart watch or other wearable computing device, to carry out a user authentication process using credentials that are stored on either the mobile computing device or the wearable computing device. However, in accordance with the embodiments described herein, such credentials are never passed between the mobile computing device and the companion device. This approach advantageously protects the security of those credentials by ensuring that they cannot be obtained by a malicious party by monitoring (or "sniffing") wireless communications between the mobile computing device and the companion device.

Figure 2:
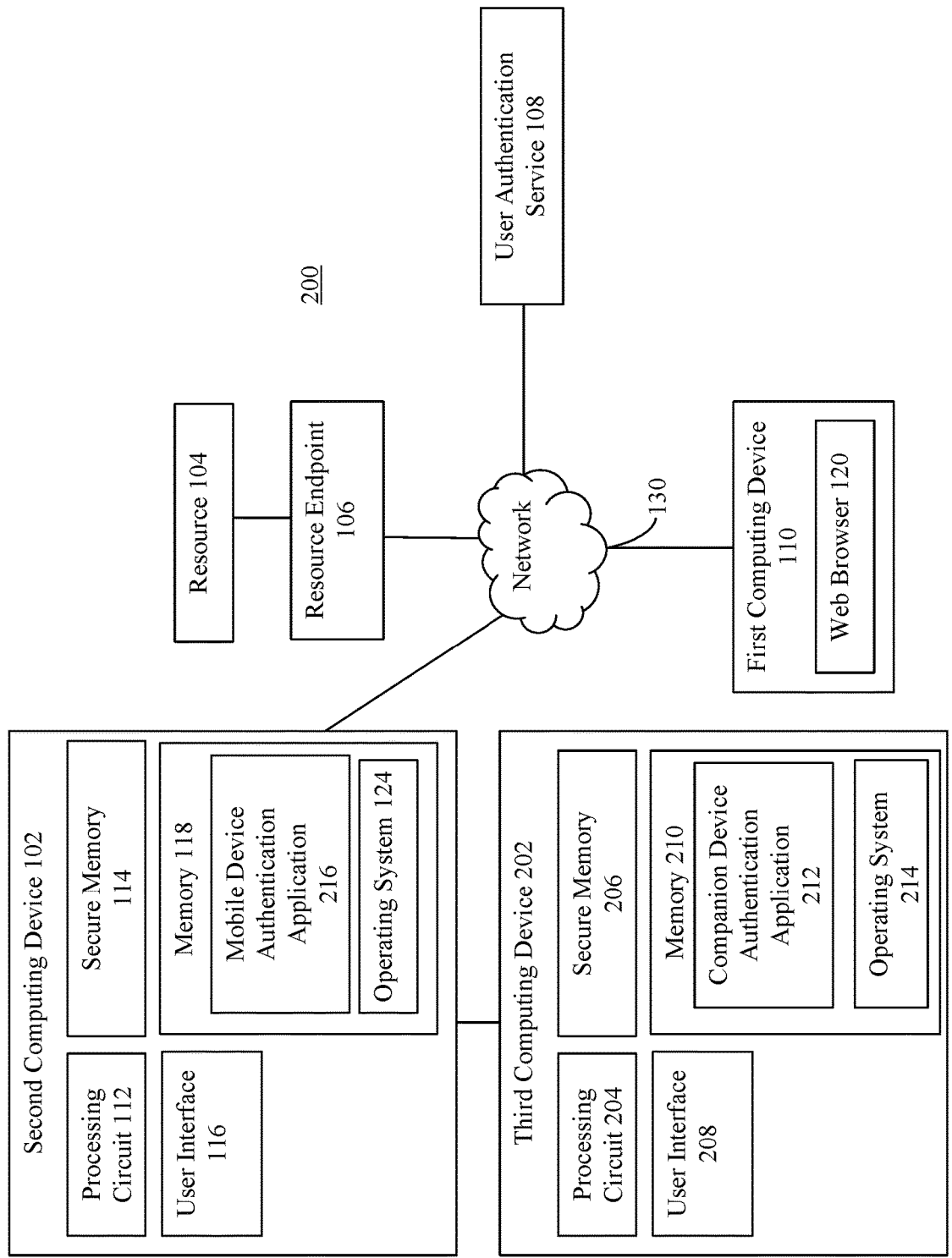
FIG. 2 is a block diagram of an example system that authenticates a user that is seeking to gain access to a resource via her primary computing device in a manner that utilizes a user's companion device that is communicatively connected to the user's mobile computing device, according to an example embodiment.

To help illustrate the foregoing, FIG. 2 will now be described. In particular, FIG. 2 is a block diagram of an example system 200 that authenticates a user that is seeking to gain access to a resource via her primary computing device in a manner that utilizes a user's companion device (e.g., a smart watch or other wearable device) paired with the user's mobile computing device (e.g., a smart phone), according to an example embodiment. As shown in FIG. 2, system 200 includes some of the same components as shown in FIG. 1, and these components may operate in a substantially similar manner with exceptions that will now be described.

As shown in FIG. 2, second computing device 102 of system 200 stores a mobile device authentication application 216 in memory 118 in place of authentication application 122. As will be discussed hereinafter, mobile device authentication application 216 is configured to interact with a companion device authentication application 212 executing on third computing device 202 and user authentication service 108 to carry out a user authentication process in which the user interacts with third computing device 202. Furthermore, mobile device authentication application 216 is configured to interact with companion device authentication application 212 and user authentication service 108 while second computing device 102 is in an unlocked state or a locked state. As used herein, the term "locked state" is used to refer to a state where the user is prevented from accessing the full functionality of second computing device 102 until a credential is entered, such as a biometric identifier or a previously-registered passcode. Furthermore, the term "unlocked state" is used to refer to a state where the user is allowed to access the full functionality of second computing device 102.

In particular, and as shown in FIG. 2, system 200 further includes third computing device 202 that is communicatively connected to second computing device 102. Third computing device 202 is intended to represent a companion computing device, such as a smart watch or other wearable computing device, that is owned by or otherwise associated with the user and that may be communicatively linked with second computing device 102. In an embodiment, third computing device 202 is connected to second computing device 102 via a wireless connection, such as a Bluetooth connection or an IEEE 802.11 connection. However, this is only an example, and any type of wired or wireless connection may be used to facilitate communication between third computing device 202 and second computing device 202.

As shown in FIG. 2, third computing device 202 includes a processing circuit 204, a memory 210, a secure memory 206, and a user interface 208. Processing circuit 204 is configured to execute certain computer programs stored in memory 210, including an operating system (OS) 214 and companion device authentication application 212. As will be discussed below, companion device authentication application 212 is used to assist in a user authentication process that will ultimately enable the user to gain access to resource 104 via first computing device 110 by interacting with user authentication service 108 via mobile device authentication application 216 of second computing device 102. Secure memory 206 is configured to store highly-sensitive information, such as one or more credentials that may be used in the aforementioned user authentication process. Secure memory 206 may comprise, for example, an encrypted database. Such encrypted database may be protected, for example, by an encryption key that is obtained based on information unique to third computing device 202 in combination with a user-defined passcode, although this is only one example. User interface 208 comprises a means by which the user can interact with third computing device 202 and may comprise, in an example in which third computing device 202 is a smart watch, a touch sensitive display and one or more buttons. It should be noted that in the example embodiment of FIG. 2, third computing device 202 is in an "unlocked state," meaning that the user is enabled to fully interact with third computing device 202. For instance, in an example where third computing device 202 is a smart watch, the smart watch is unlocked and on the user's wrist.

In the approach represented by system 200, when a user wishes to access resource 104 via first computing device 110, the user may interact with web browser 120 to cause web browser 120 to send an access request to resource endpoint 106 and if user authentication is required to access resource 104, resource endpoint 106 will invoke user authentication service 108 to authenticate the user prior to determining whether or not to grant or deny access to resource 104. However, the user authentication process that is performed will not only involve first computing device 110 and second computing device 102 but will also involve third computing device 202. As will be described hereinafter, this approach enables the user to interact with third computing device 202 while second computing device 102 remains in a locked state.

In accordance with the example of FIG. 2, one such user authentication process may be a password-less user authentication process. In accordance with this process, user authentication service 108 prompts the user, via web browser 120, to either enter a password required for user authentication or to elect to perform user authentication in a manner that does not require entering such a password. If the user elects to perform password-less user authentication, then user authentication service 108 interacts with companion device authentication application 212 executing on third computing device 202 (via mobile device authentication application 216) to obtain therefrom a user credential stored in secure memory 206. Upon receipt of this secured user credential, user authentication service 108 may then authorize the user to access resource 104. For example, user authentication service 108 may authorize the user to access resource 104 by sending a suitable access token back to resource endpoint 106. Upon receipt of the access token, resource endpoint 106 then provides the user with access to resource 104 via first computing device 110.

Companion device authentication application 212 may provide the secured user credential to user authentication service 108, for example, by signing a token that includes a value (e.g., a blob or nonce value) provided by user authentication service 108 with a private signing key that is stored in secure memory 206 and then returning the signed token to user authentication service 108 via mobile device authentication application 216. User authentication service 108 can then verify the signed token using a previously-registered public signing key that corresponds to the private signing key. However, this is only one example of a way in which companion device authentication application 212 can provide a user credential to user authentication service 108, and various other user credentials and techniques may be used.

Before providing the user credential to user authentication service 108, companion device authentication application 212 requires the user to authorize the access attempt through some form of interaction with user interface 208 of third computing device 202. For example, the user may be required to simply indicate via user interface 208 that the access attempt should be allowed. As another example, the user may be required to select a number or code displayed on user interface 208 that is identical to one displayed via web browser 120 of first computing device 110 or provide a response to some other security challenge. Still other means for obtaining user authorization of the access attempt may be used. In an example scenario in which second computing device 102 is a smart phone and third computing device 202 is a smart watch, the user is enabled to carry out the authentication process by interacting only with the smart watch, and is not required to find or unlock the smart phone. Furthermore, the private signing key is never passed between the smart watch and the smart phone, which enhances the security of the system.

In further accordance with the example of FIG. 2, an alternative user authentication process may be an MFA user authentication process. In accordance with this process, user authentication service 108 prompts the user, via web browser 120, to enter a password required for user authentication. The password serves as a first authentication factor. User authentication service 108 then also interacts with companion device authentication application 212 executing on third computing device 202 (via mobile device authentication application 216 executing on second computing device 102) to obtain one or more additional authentication factors. In this example, a personal identification code that is stored in secure memory 114 and provided to user authentication service 108 provides an additional authentication factor. Upon receipt of the personal identification code, user authentication service 108 may then authorize the user to access resource 104. For example, user authentication service 108 may authorize the user to access resource 104 by sending a suitable access token back to resource endpoint 106. Upon receipt of the access token, resource endpoint 106 then provides the user with access to resource 104 via first computing device 110.

Mobile device authentication application 216 may provide the personal identification code to user authentication service 108, for example, by reading the personal identification code from secure memory 114 and transmitting the personal identification code to user authentication service 108. Mobile device authentication application 216 may read the personal identification code from secure memory 114 in response to receiving an approval from companion device authentication application 212. User authentication service 108 can then compare the personal identification code to a previously-registered personal identification code to make sure that they match.

Before providing the approval to mobile device authentication application 216 such that personal identification code may be read and provided to user authentication service 108, mobile device authentication application 216 may require the user to authorize the access attempt through some form of interaction with user interface 208 of third computing device 202. For example, the user may be required to select a number or code displayed on user interface 208 that is identical to one displayed via web browser 120 of first computing device 110 or provide a response to some other security challenge. However, this is not intended to be limiting and other means for obtaining user authorization of the access attempt may be used. As also noted above with respect to the password-less approach, in an example scenario in which second computing device 102 is a smart phone and third computing device 202 is a smart watch, the user is enabled to carry out the authentication process by interacting only with the smart watch and need not find or unlock the smart phone. Furthermore, the personal identification code is never passed between the smart phone and the smart watch, which enhances the security of the system.

Figure 3:
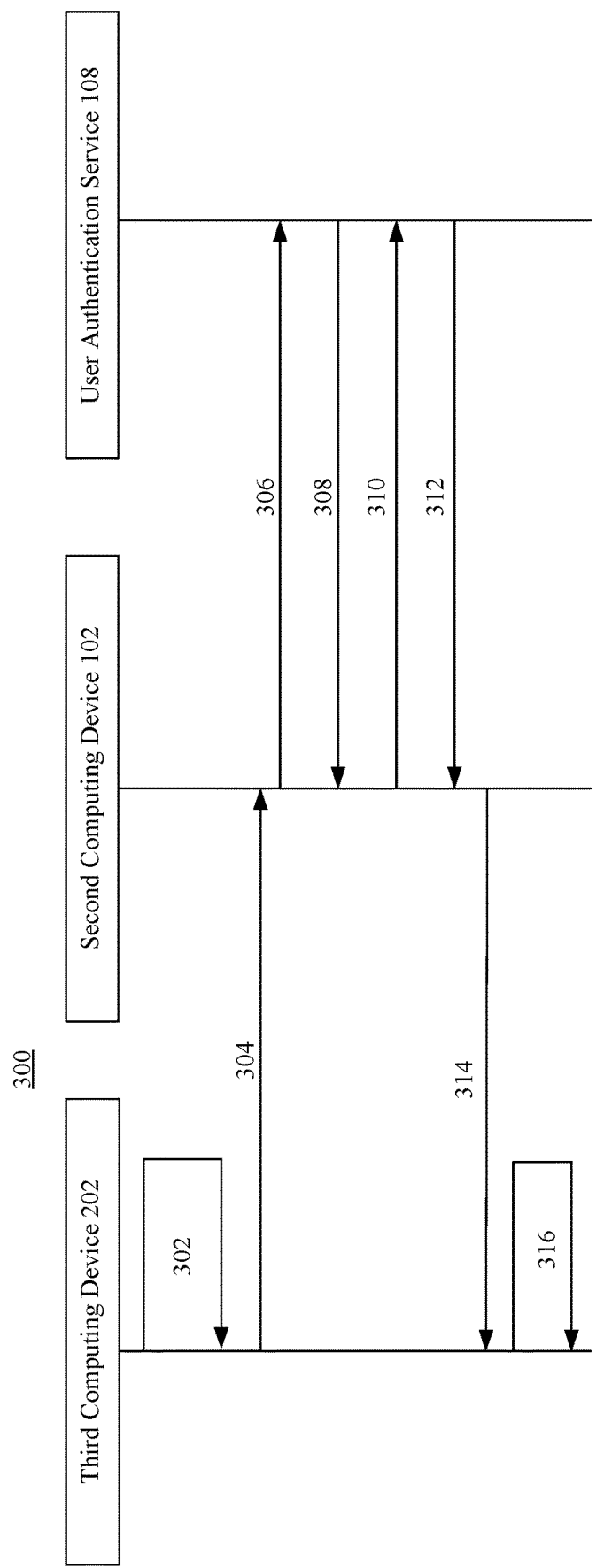
FIG. 3 is an example sequence diagram for generating and securely storing a signing key pair on a companion device and for registering a public key of the signing key pair with an authentication service to facilitate a password-less user authentication process, according to an example embodiment.

The aforementioned approaches may be carried out in various ways. A particular example of how an embodiment may operate in accordance with the foregoing techniques will now be described in reference to FIG. 3. In particular, FIG. 3 is an example sequence diagram 300 for generating and securely storing a signing key pair on a companion device and for registering a public key of the signing key pair with an authentication service to facilitate a password-less user authentication process, according to an example embodiment. As shown in FIG. 3, sequence diagram 300 shows interactions between various components that were described above in reference to FIG. 2. In particular, sequence diagram 300 shows interactions between third computing device 202 and second computing device 102, and between second computing device 102 and user authentication service 108.

As shown in FIG. 3, companion device authentication application 212 executing on third computing device 202 generates a signing key pair (302), wherein the signing key pair comprises a private key and a public key.

In an embodiment, companion device authentication application 212 performs operation (302) only if a personal identification code (such as a PIN) has been enabled for third computing device 202. Such personal identification code may be required, for example, to unlock third computing device 202 and interact with companion device authentication application 212. By requiring the enabling of such a personal identification code before performing operation (302), an embodiment thereby ensures that the user will be required to enter the personal identification code before interacting with companion device authentication application 212 to carry out the aforementioned password-less user authentication process.

In further accordance with such an embodiment, if at some later point in time, companion device authentication application 312 determines that the personal identification code has been disabled for third computing device 202, then companion device authentication application may delete the signing key pair. Again, this ensures that the password-less user authentication process will only work if third computing device 202 requires a personal identification code to be entered before the user may interact with companion device authentication application 212.

In further accordance with this example, companion device authentication application 312 executing on third computing device 202 transmits the public key to mobile device authentication application 212 executing on second computing device 102 (304) such that the public key may be registered with user authentication service 108. The public key may be registered in various ways. For example, and as shown in FIG. 3, mobile device authentication application 212 first obtains and provides some user authentication input to user authentication service 108 (306). The user authentication input may comprise user input that provides for strong authentication. In response to receiving the user authentication input, user authentication service 108 provides a time-limited token to mobile device authentication application 212 (308). Mobile device authentication application 212 then utilizes the time-limited token to transmit a request to user authentication service 108 to register the public key (310). In embodiments, the request may include the time-limited token along with the public key. User authentication service 108 then registers the public key.

Once the public key has been registered by user authentication service 108, user authentication service 108 generates and transmits a server key identifier to mobile device authentication application executing on second computing device 102 (312). The server key identifier may comprise an identifier of the public key that is maintained by the user authentication service 108 and that may be used in future communications therewith to identify the public key. The server key identifier may be much shorter than the public key itself and using it in subsequent communications may enhance efficiency. In response to receiving the server key identifier, second computing device 102 forwards the server key identifier to third computing device 202 (314). Third computing device 202 then stores the signing key pair, a local identifier thereof and the server key identifier (316).

Figure 4:
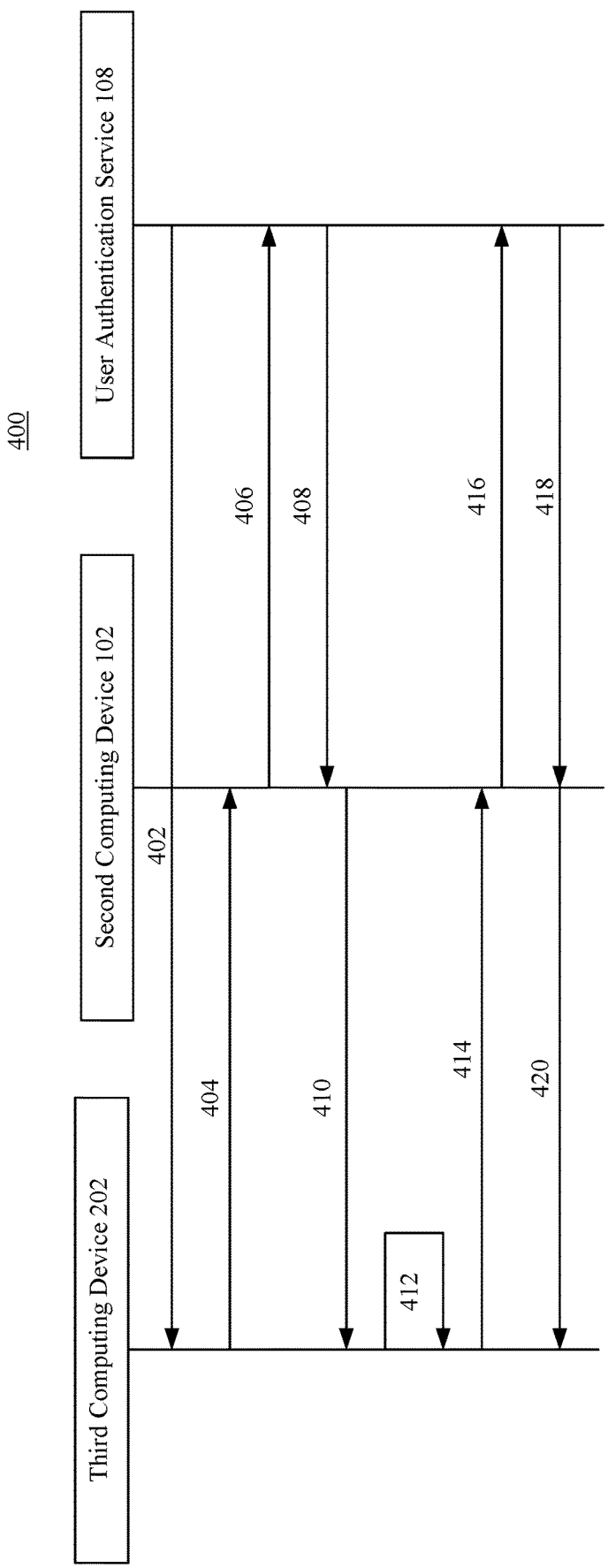
FIG. 4 is an example sequence diagram for carrying out the password-less user authentication process, according to an example embodiment.

Following the example of FIG. 3, FIG. 4 is an example sequence diagram 400 for carrying out the password-less user authentication process, according to an example embodiment. As shown in FIG. 4, user authentication service 108 transmits a user authentication request to second computing device 102 and operating system 124 executing thereon passes the user authentication request to operating system 214 executing on third computing device 202 (402). Operating system 214 then passes the user authentication request to companion device authentication application 212.

As further shown in FIG. 4, companion device authentication application 212 executing on third computing device 202 transmits an approval of the user authentication request to mobile device authentication application 216 executing on second computing device 102 (404). For instance, and with reference to FIG. 2, companion device authentication application 212 may display information related to the user authentication request to the user via user interface 208 such that the user may approve or deny the user authentication request. In an embodiment, the user authentication request may include a challenge such that the approval of the user authentication request includes the user's response to the challenge.

In response to receiving the approval, mobile device authentication application 216 executing on second computing device 102 sends a value request to user authentication service 108 (406). In response to receiving the value request, user authentication service 108 transmits a value to mobile device authentication application 216 executing on second computing device 102 (408). In an embodiment, the value may comprise a cryptographic nonce value, although this example is not intended to be limiting.

As further shown in FIG. 4, in response to receiving the value, mobile device authentication application 216 executing on second computing device 102 sends a token to companion device authentication application 212 executing on third computing device 202 (410), wherein the token includes the value. Companion device authentication application 212 executing on third computing device 202 signs the token with the securely-stored private signing key (412) and then transmits the signed token to mobile device authentication application 216 executing on second computing device 102 (414). Mobile device authentication application 216 then transmits the signed token to user authentication service 108 (416). User authentication service 108 utilizes the signed token and the public key to determine if the user authentication request is to be granted.

In an embodiment, user authentication service 108 verifies the signed token using the public key. If the signed token is verified, then the password-less user authentication is deemed successful. As shown in FIG. 4, in response to a successful user authentication, user authentication service 108 generates and transmits a success message to operating system 124 executing on second computing device 102 (418), which forwards the success message to operating system 214 executing on third computing device 202 (420).

Figure 5:
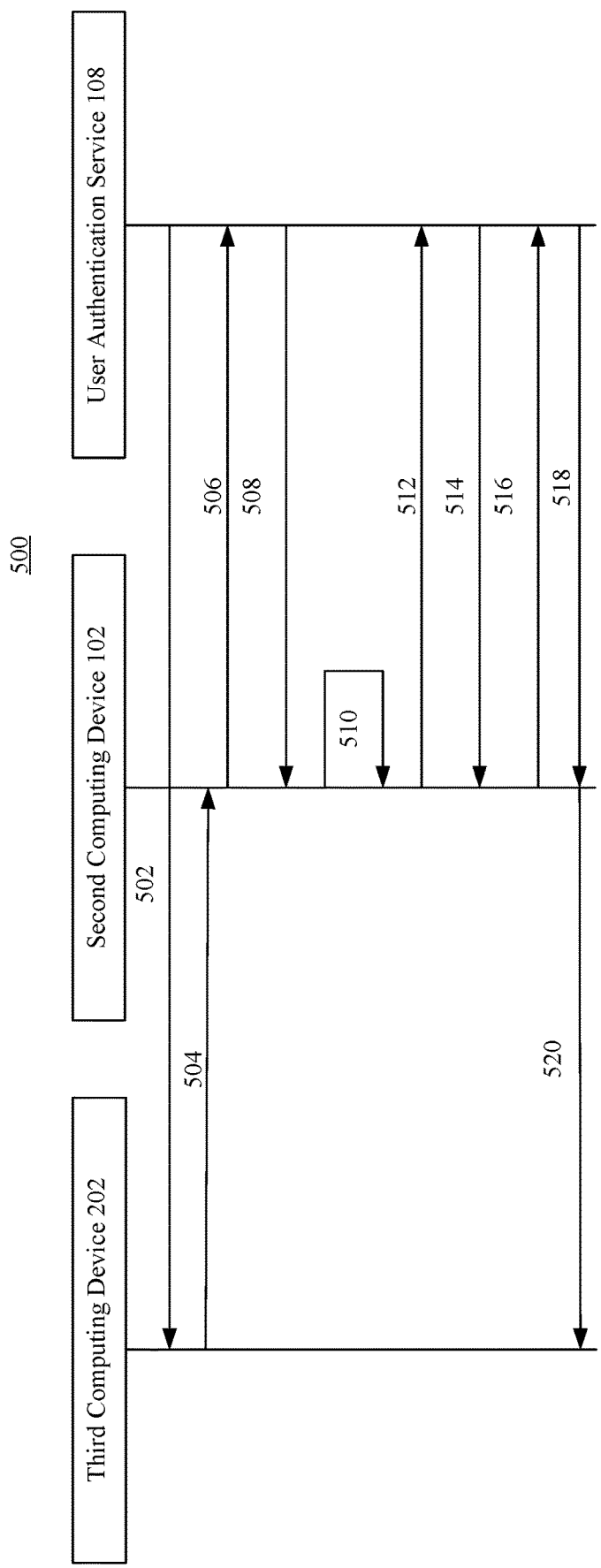
FIG. 5 is an example sequence diagram for carrying out a multi-factor authentication (MFA) user authentication process, according to an example embodiment.

As noted above, various user authentication processes may be used to authenticate a user. Another example of how an embodiment may operate in accordance with the foregoing techniques will now be described in reference to FIG. 5. In particular, FIG. 5 is an example sequence diagram 500 for carrying out a multi-factor authentication (MFA) user authentication process, according to an example embodiment. As shown in FIG. 5, sequence diagram 500 shows interactions between various components that were described above in reference to FIGS. 2-4. In particular, sequence diagram 500 shows interactions between third computing device 202 and second computing device 102, and between second computing device 102 and user authentication service 108.

As shown in FIG. 5, user authentication service 108 transmits a user authentication request to second computing device 102 and operating system 124 executing thereon passes the user authentication request to operating system 124 executing on third computing device 202 (502). Operating system 214 then passes the user authentication request to companion device authentication application 212.

As further shown in FIG. 5, companion device authentication application 212 executing on third computing device 202 transmits an approval of the user authentication request to mobile device authentication application 216 executing on second computing device 102 (504). For instance, and with reference to FIG. 2, companion device authentication application 212 may display information related to the user authentication request to the user via user interface 208 such that the user may approve or deny the user authentication request. Obtaining the approval from the user may also entail the user responding to a security challenge in certain embodiments.

In response to receiving the approval, mobile device authentication application 216 executing on second computing device 102 transmits an authentication details request to user authentication service 108 (506). The authentication details request may represent a request to obtain additional details needed to read a personal identification code securely stored on second computing device 102. As shown in FIG. 5, in response to receiving the authentication details request, user authentication service 108 transmits authentication details to second computing device 102 (508). In an alternative embodiment, authentication details may not be required and mobile device authentication application 216 executing on second computing device 102 may read the personal identification code from secure memory immediately after receiving the approval.

As further shown in FIG. 5, in response to receiving the authentication details, mobile device authentication application 216 executing on second computing device 102 reads the personal identification code from secure memory 114 (510). Mobile device authentication application 216 then transmits the personal identification code to user authentication service 108 as part of a validation request (512). User authentication service 108 then validates the personal identification code by comparing it to a previously-stored copy of the personal identification code. If the codes match, then the personal identification code is validated and user authentication service 108 sends a personal identification code valid response to mobile device authentication application 216 executing on second computing device 102 (514).

In response to receiving the valid response, mobile device authentication application 216 executing on second computing device 102 transmits an authentication result request to user authentication service 108 (516). Upon receiving the authentication result request, user authentication service 108 generates and transmits a success message to operating system 124 executing on second computing device 102 (518). Operating system 124 executing on second computing device 102 then provides the success message to operating system 214 executing on third computing device 202 (520).

Figure 6:
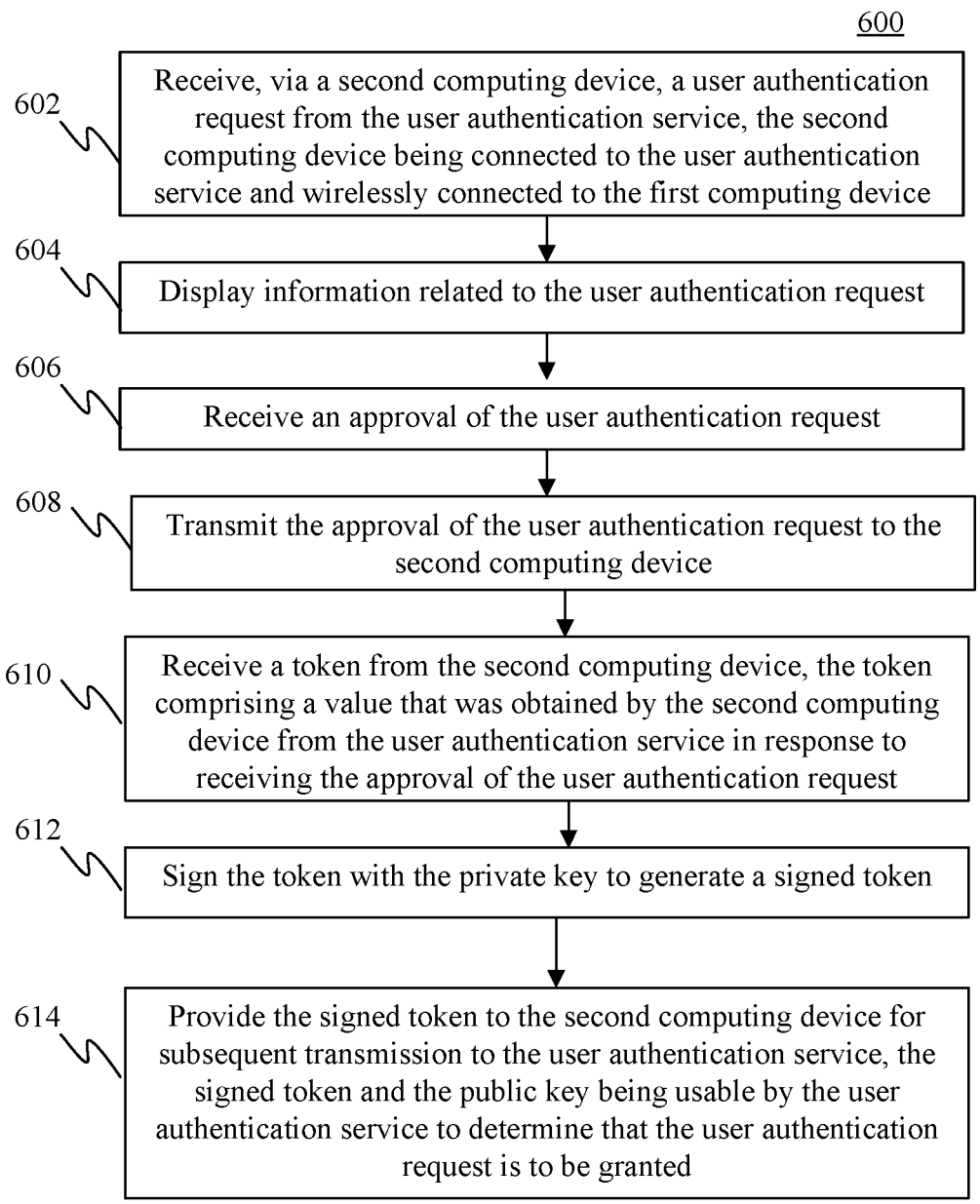
FIG. 6 depicts a flowchart of a method performed by a companion device as part of the password-less user authentication process, in accordance with an example embodiment.

FIG. 6 depicts a flowchart 600 of a method performed by a companion device as part of the password-less user authentication process, in accordance with an example embodiment. The method of flowchart 600 may be performed, for example, by third computing device 202 as described above in reference to FIG. 2 and FIG. 4.

As shown in FIG. 6, the method of flowchart 600 begins at step 602 in which a user authentication request is received from the user authentication service via a second computing device, where the second computing device is connected to the user authentication service and wirelessly connected to the first computing device. For example, and with continued reference to FIG. 2 and FIG. 4, second computing device 102 is connected to user authentication service 108 and wirelessly connected to third computing device 202 such that a user authentication request is received from user authentication service 108 via second computing device 102. As noted above, second computing device 102 may be wirelessly connected to third computing device 202 in various ways, such as but not limited to Bluetooth or an IEEE 802.11 connection. In embodiments, the user authentication request may comprise a challenge such as requiring the user to select a number or code displayed on user interface 208 that is identical to one displayed via web browser 120 of first computing device 110 or provide a response to some other security challenge.

At step 604, information related to the user authentication request is displayed. For example, and with continued reference to FIG. 2 and FIG. 4, information related to the user authentication request is displayed to the user via user interface 208. This information may include a prompt for user approval and/or a response to a security challenge.

At step 606, an approval of the user authentication request is received. For example, and with continued reference to FIG. 2 and FIG. 4, an approval is received from the user via user interface 208 and transmitted to third computing device 202. In embodiments where the user authentication request comprises a challenge, the approval may comprise a user response to the challenge.

At step 608, the approval of the user authentication request is transmitted to the second computing device for subsequent transmission to the user authentication service. For example, and with continued reference to FIG. 4, the approval is transmitted from third computing device 202 to user authentication service 108 via second computing device 102.

At step 610, a token is received from the second computing device, the token comprising a value that was obtained by the second computing device from the user authentication service in response to receiving the approval of the user authentication request. For example, and with continued reference to FIG. 4, a value is obtained by second computing device 102 from user authentication service 108 and transmitted to third computing device 202 as part of a token. As noted above, the value may comprise a cryptographic nonce value, or some other value.

At step 612, the token is signed with the private key to generate a signed token. For example, and with continued reference to FIG. 4, third computing device 202 signs the token to generate a signed token.

At step 614, the signed token is provided to the second computing device for subsequent transmission to the user authentication service, the signed token and the public key being usable by the user authentication service to determine that the user authentication request is to be granted. For example, and with reference to FIG. 3 and FIG. 4, third computing device 202 provides signed token 408 to second computing device 102 and second computing device 102 transmits signed token 408 to user authentication service 108. User authentication service 108 then uses the signed token and the public key 304 to determine if the user authentication request is to be granted.

Figure 7:
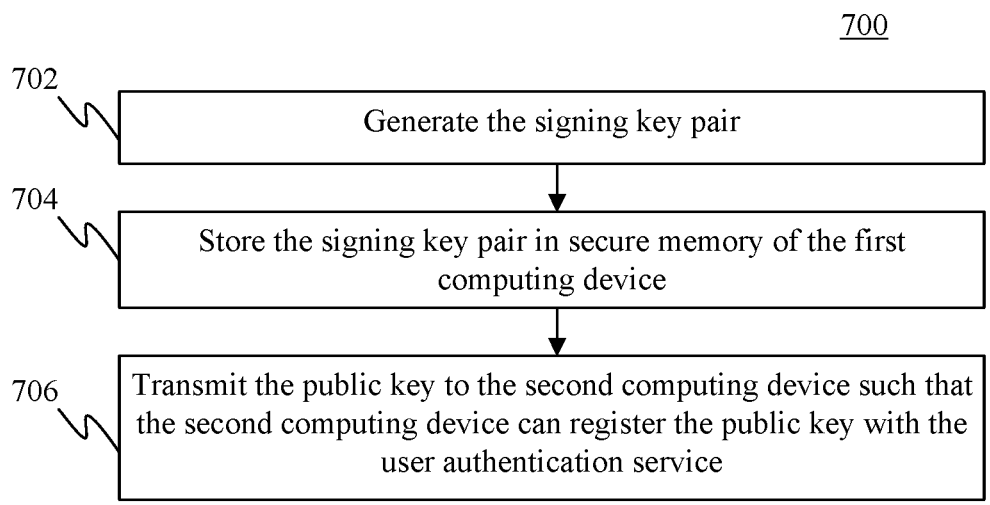
FIG. 7 depicts a flowchart of a method performed by a companion device for generating and securely storing a signing key pair and for transmitting the public key for registration at a user authentication service via a mobile computing device, in accordance with an example embodiment.

As noted above, prior to the password-less process being used, the signing key pair must be generated such that third computing device 202 may securely store the signing key pair and the public key may be registered with user authentication service 108. For instance, FIG. 7 depicts a flowchart 700 of a method performed by a companion device for generating and securely storing a signing key pair and for transmitting the public key for registration at a user authentication service via a mobile computing device, in accordance with an example embodiment. The method of flowchart 700 may be performed, for example, by third computing device 202 as described above in reference to FIG. 2 and FIG. 3.

As shown in FIG. 7, the method of flowchart 700 begins at step 702 in which the signing key pair is generated. For example, and with continued reference to FIG. 2 and FIG. 5, companion device authentication application 212 generates a signing key pair. In an embodiment, companion device authentication application 212 generates the signing key pair only if a personal identification code has been enabled for third computing device 202.

At step 704, the signing key pair is stored in secure memory of the first computing device. For example, and with continued reference to FIG. 2 and FIG. 3, the signing key pair is stored in secure memory 206 of third computing device 202. In an embodiment where the signing key pair is generated only if a personal identification code has been enabled for third computing device 202, the signing key pair is deleted in response to determining that the personal identification code has been disabled for third computing device 202.

At step 706, the public key is transmitted to the second computing device such that the second computing device can register the public key with the user authentication service. For example, and with continued reference to FIG. 2 and FIG. 3, third computing device 202 transmits a public key to second computing device 102 such that second computing device 202 registers the public key with user authentication service 108. Second computing device 102 may register public key in various ways. For example, and as shown in FIG. 3, second computing device 102 may first obtain and provide a user authentication input to user authentication service 108. Second computing device 102 may further, in response to providing the user authentication input, receive a time-limited token from user authentication service 108 and utilize the time-limited token to transmit a request to register the public key with user authentication service 108.

Figure 8:
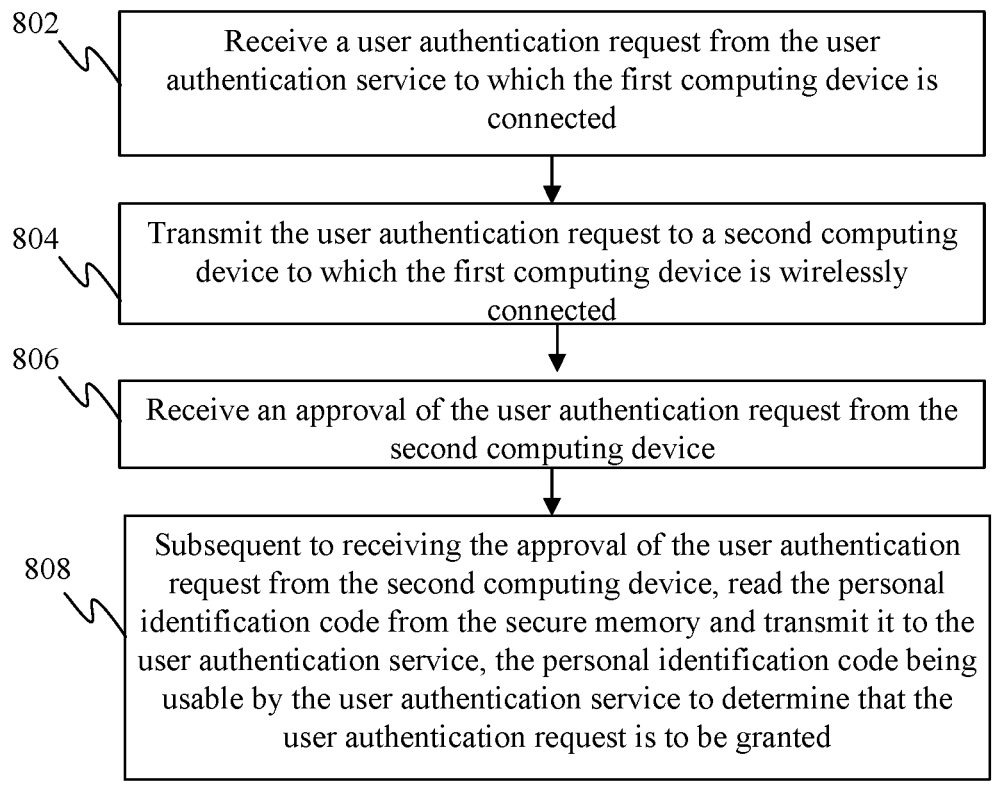
FIG. 8 depicts a flowchart of a method performed by a mobile computing device as part of the MFA user authentication process, in accordance with an example embodiment.

As noted above, embodiments herein describe various user authentication processes. For instance. FIG. 8 depicts a flowchart 800 of a method performed by a mobile computing device as part of the MFA user authentication process, in accordance with an example embodiment. The method of flowchart 800 may be performed, for example, by second computing device 102 as described above in reference to FIG. 2 and FIG. 5.

As shown in FIG. 8, the method of flowchart 800 begins at step 802 in which a user authentication request is received from the user authentication service to which the first computing device is connected. For example, and with continued reference to FIG. 5, second computing device 102 is connected to user authentication service 108 such that a user authentication request is received from user authentication service 108.

At step 804, the user authentication request is transmitted to a second computing device to which the first computing device is wirelessly connected. For example, and with continued reference to FIG. 2 and FIG. 5, the user authentication request is transmitted to third computing device 202 to which second computing device 102 is wirelessly connected. As noted above, second computing device 102 may be wirelessly connected to third computing device 202 in various way, such as by Bluetooth or IEEE 802.11 connection.

At step 806, an approval of the user authentication request is received from the second computing device. For example, and with continued reference to FIG. 2 and FIG. 5, the approval is received from third computing device 202.

At step 808, subsequent to receiving the approval of the user authentication request from the second computing device, a personal identification code is read from secure memory and transmitted to the user authentication service, the personal identification code being usable by the user authentication service to determine that the user authentication request is to be granted. For example, and with continued reference to FIG. 2 and FIG. 5, second computing device 102 reads the personal identification code from secure memory 114 and may transmit the personal identification code to user authentication service 108. As noted above, the personal identification code is usable by user authentication service 108 to determine if the user authentication request is to be granted.

Figure 9:
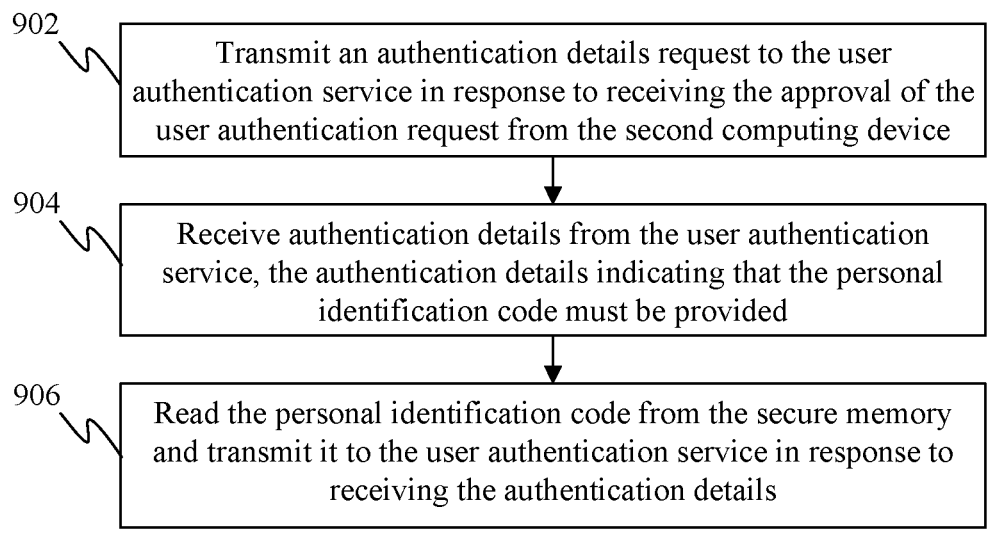
FIG. 9 depicts a flowchart of additional steps that may be performed by a mobile computing device as part of the MFA user authentication process, in accordance with an example embodiment.

As noted above, prior to the personal identification code being read, additional details may be required to be read. For instance, FIG. 9 depicts a flowchart 900 of additional steps that may be performed by a mobile computing device as part of the MFA user authentication process, in accordance with an example embodiment. The method of flowchart 900 may be performed, for example, by second computing device 102 as described above in reference to FIG. 5.

As shown in FIG. 9, the method of flowchart 900 begins at step 902 in which an authentication details request is transmitted to the user authentication service in response to receiving the approval of the user authentication request from the second computing device. For example, and with continued reference to FIG. 5, an authentication details request is transmitted from second computing device 102 to user authentication service 108.

At step 904, authentication details are received from the user authentication service, the authentication details indicating that the personal identification code must be provided. For example, and with continued reference to FIG. 5, the authentication details are transmitted from user authentication service 108 to second computing device 102.

At step 906, the personal identification code is read from the secure memory and transmitted to the user authentication service in response to receiving the authentication details. For example, and with continued reference to FIG. 5, in response to second computing device 102 receiving authentication details, second computing device 102 reads personal identification code from secure memory and transmits it to user authentication service 108.

III. Example Mobile and Stationary Device Embodiments

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry.

As noted herein, the embodiments described, including, such as system 100 of FIG. 1, system 200 of FIG. 2, sequence diagram 300 of FIG. 3, sequence diagram 400 of FIG. 4, and sequence diagram 500 of FIG. 5, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), or an application specific integrated circuit (ASIC). A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of mobile systems and computing devices provided herein are provided for purposes of illustration, and are not intended to be limiting. Embodiments may be implemented in further types of computer systems, as would be known to persons skilled in the relevant art(s).

Figure 10:
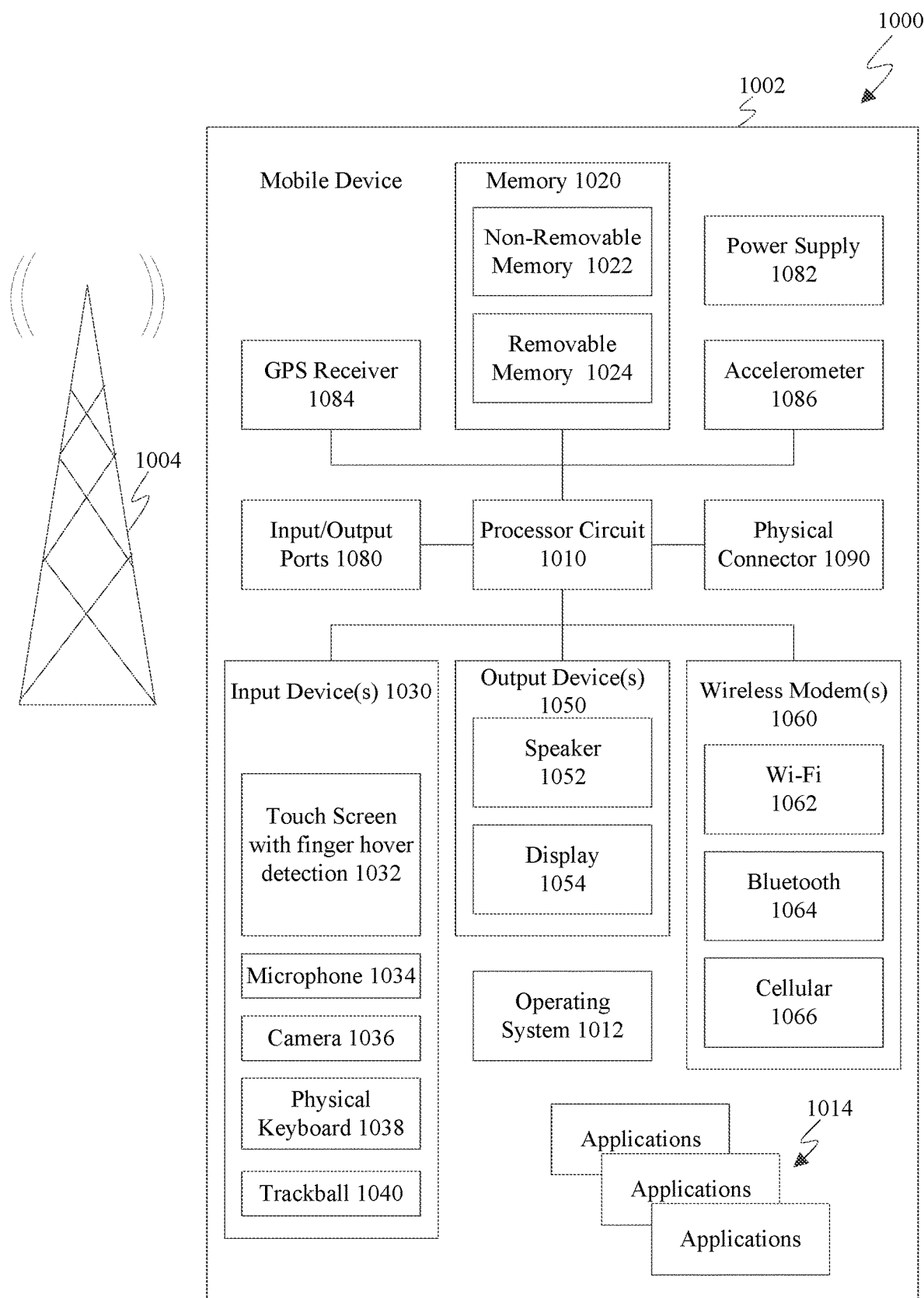
FIG. 10 is a block diagram of an exemplary mobile system that includes a mobile device that may be used to implement various embodiments.

FIG. 10 is a block diagram of an exemplary mobile system 1000 that includes a mobile device 1002 that may implement embodiments described herein. For example, mobile device 1002 may be used to implement any system, client, or device, or components/subcomponents thereof, in the preceding sections. As shown in FIG. 10, mobile device 1002 includes a variety of optional hardware and software components. Any component in mobile device 1002 can communicate with any other component, although not all connections are shown for ease of illustration. Mobile device 1002 can be any of a variety of computing devices (e.g., cell phone, smart phone, handheld computer, Personal Digital Assistant (PDA), etc.) and can allow wireless two-way communications with one or more mobile communications networks 1004, such as a cellular or satellite network, or with a local area or wide area network.

Mobile device 1002 can include a controller or processor 1010 (e.g., signal processor, microprocessor, ASIC, or other control and processing logic circuitry) for performing such tasks as signal coding, data processing, input/output processing, power control, and/or other functions. An operating system 1012 can control the allocation and usage of the components of mobile device 1002 and provide support for one or more application programs 1014 (also referred to as "applications" or "apps"). Application programs 1014 may include common mobile computing applications (e.g., e-mail applications, calendars, contact managers, web browsers, messaging applications) and any other computing applications (e.g., word processing applications, mapping applications, media player applications).

Mobile device 1002 can include memory 1020. Memory 1020 can include non-removable memory 1022 and/or removable memory 1024. Non-removable memory 1022 can include RAM, ROM, flash memory, a hard disk, or other well-known memory devices or technologies. Removable memory 1024 can include flash memory or a Subscriber Identity Module (SIM) card, which is well known in GSM communication systems, or other well-known memory devices or technologies, such as "smart cards." Memory 1020 can be used for storing data and/or code for running operating system 1012 and application programs 1014. Example data can include web pages, text, images, sound files, video data, or other data to be sent to and/or received from one or more network servers or other devices via one or more wired or wireless networks. Memory 1020 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 1020. These programs include operating system 1012, one or more application programs 1014, and other program modules and program data. Examples of such application programs or program modules may include, for example, computer program logic (e.g., computer program code or instructions) for implementing one or more of system 100 of FIG. 1, system 200 of FIG. 2, sequence diagram 300 of FIG. 3, sequence diagram 400 of FIG. 4, and sequence diagram 500 of FIG. 5, along with any components and/or subcomponents thereof, as well any operations and portions of flowcharts/flow diagrams described herein and/or further examples described herein.

Mobile device 1002 can support one or more input devices 1030, such as a touch screen 1032, a microphone 1034, a camera 1036, a physical keyboard 1038 and/or a trackball 1040 and one or more output devices 1050, such as a speaker 1052 and a display 1054. Other possible output devices (not shown) can include piezoelectric or other haptic output devices. Some devices can serve more than one input/output function. For example, touch screen 1032 and display 1054 can be combined in a single input/output device. Input devices 1030 can include a Natural User Interface (NUI).

One or more wireless modems 1060 can be coupled to antenna(s) (not shown) and can support two-way communications between processor 1010 and external devices, as is well understood in the art. Modem 1060 is shown generically and can include a cellular modem 1066 for communicating with the mobile communication network 1004 and/or other radio-based modems (e.g., Bluetooth 1064 and/or Wi-Fi 1062). At least one wireless modem 1060 is typically configured for communication with one or more cellular networks, such as a GSM network for data and voice communications within a single cellular network, between cellular networks, or between the mobile device and a public switched telephone network (PSTN).

Mobile device 1002 can further include at least one input/output port 1080, a power supply 1082, a satellite navigation system receiver 1084, such as a Global Positioning System (GPS) receiver, an accelerometer 1086, and/or a physical connector 1090, which can be a USB port, IEEE 1394 (FireWire) port, and/or RS-232 port. The illustrated components of mobile device 1002 are not required or all-inclusive, as any components can be deleted and other components can be added as would be recognized by one skilled in the art.

In an embodiment, mobile device 1002 is configured to implement any of the above-described features of flowcharts/embodiments herein. Computer program logic for performing any of the operations, steps, and/or functions described herein may be stored in memory 1020 and executed by processor 1010.

Figure 11:
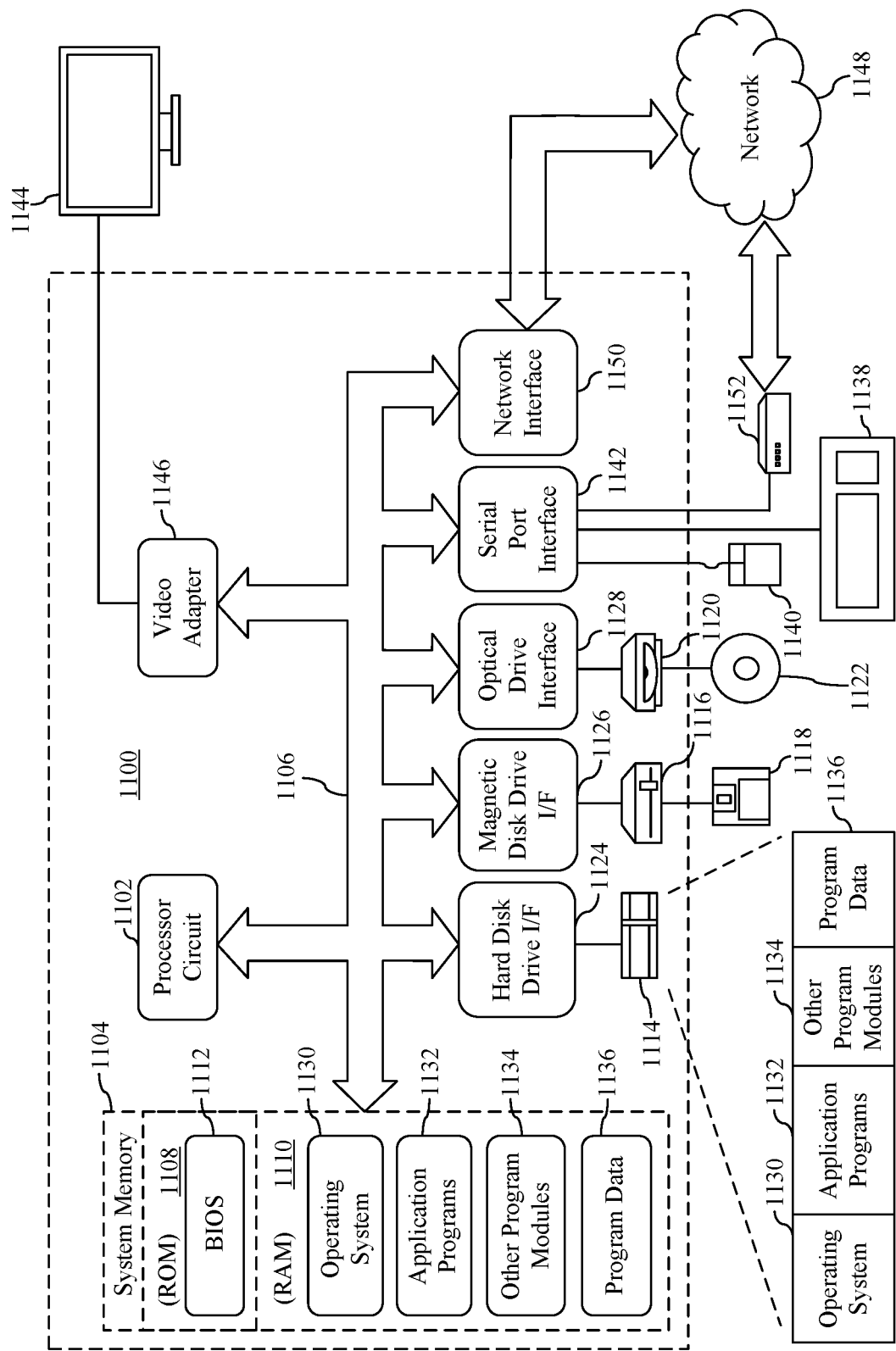
FIG. 11 is a block diagram of an example computing device that may be used to implement various embodiments.

FIG. 11 is a block diagram of an example computing device that may be used to implement various embodiments. For example, embodiments described herein may be implemented in one or more computing devices similar to computing device 1100 in stationary or mobile computer embodiments, including one or more features of computing device 1100 and/or alternative features. The description of computing device 1100 provided herein is provided for purposes of illustration, and is not intended to be limiting. Embodiments may be implemented in further types of computer systems and/or game consoles, etc., as would be known to persons skilled in the relevant art(s).

As shown in FIG. 11, computing device 1100 includes one or more processors, referred to as processor circuit 1102, a system memory 1104, and a bus 1106 that couples various system components including system memory 1104 to processor circuit 1102. Processor circuit 1102 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1102 may execute program code stored in a computer readable medium, such as program code of operating system 1130, application programs 1132, other programs 1134, etc. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computing device 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs. ROMs, and other hardware storage media.

A number of program modules may be stored on the hard disk, magnetic disk, optical disk. ROM, or RAM. These programs include operating system 1130, one or more application programs 1132, other programs 1134, and program data 1136. Application programs 1132 or other programs 1134 may include, for example, computer program logic (e.g., computer program code or instructions) for implementing embodiments described herein, such as system 100 of FIG. 1, system 200 of FIG. 2, sequence diagram 300 of FIG. 3, sequence diagram 400) of FIG. 4, and sequence diagram 500 of FIG. 5, along with any components and/or subcomponents thereof, as well any operations and portions of flowcharts/flow diagrams described herein and/or further examples described herein.

A user may enter commands and information into the computing device 1100 through input devices such as keyboard 1138 and pointing device 114). Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1102 through a serial port interface 1142 that is coupled to bus 1106, but may be connected by other interfaces, such as a parallel port, game port, or a universal serial bus (USB).

A display screen 1144 is also connected to bus 1106 via an interface, such as a video adapter 1146. Display screen 1144 may be external to or incorporated in computing device 1100. Display screen 1144 may display information, as well as being a user interface for receiving user commands and/or other information (e.g., by touch, finger gestures, virtual keyboard, etc.). In addition to display screen 1144, computing device 1100 may include other peripheral output devices (not shown) such as speakers and printers.

Computing device 1100 is connected to a network 1148 (e.g., the Internet) through an adaptor or network interface 1150, a modem 1152, or other means for establishing communications over the network. Modem 1152, which may be internal or external, may be connected to bus 1106 via serial port interface 1142, as shown in FIG. 11, or may be connected to bus 1106 using another interface type, including a parallel interface.

As used herein, the terms "computer program medium," "computer-readable medium," and "computer-readable storage medium," etc., are used to refer to physical hardware media such as the hard disk associated with hard disk drive 1114, removable magnetic disk 1118, removable optical disk 1122, other physical hardware media such as RAMs, ROMs, flash memory cards, digital video disks, zip disks, MEMs, nanotechnology-based storage devices, and further types of physical/tangible hardware storage media (including memory 1120 of FIG. 11). Such computer-readable media and/or storage media are distinguished from and non-overlapping with communication media and propagating signals (do not include communication media and propagating signals). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1132 and other programs 1134) may be stored on the hard disk, magnetic disk, optical disk, ROM, RAM, or other hardware storage medium. Such computer programs may also be received via network interface 1150, serial port interface 1142, or any other interface type. Such computer programs, when executed or loaded by an application, enable computing device 1100 to implement features of embodiments discussed herein. Accordingly, such computer programs represent controllers of the computing device 1100.

Embodiments are also directed to computer program products comprising computer code or instructions stored on any computer-readable medium or computer-readable storage medium. Such computer program products include hard disk drives, optical disk drives, memory device packages, portable memory sticks, memory cards, and other types of physical storage hardware.

IV. Additional Exemplary Embodiments

A system includes a first computing device. The first computing device includes a processing circuit; a secure memory connected to the processing circuit, the secure memory storing a signing key pair that includes a private key and a public key, the public key being registered with a user authentication service that comprises one or more user authentication servers; and a memory connected to the processing circuit, the memory storing computer program instructions, the computer program instructions being executable by the processing circuit to cause the processing circuit to: receive via a second computing device a user authentication request from the user authentication service, the second computing device being connected to the user authentication service and wirelessly connected to the first computing device; display information related to the user authentication request; receive an approval of the user authentication request; transmit the approval of the user authentication request to the second computing device; receive a token from the second computing device, the token comprising a value that was obtained by the second computing device from the user authentication service in response to receiving the approval of the user authentication request; sign the token with the private key to generate a signed token; and provide the signed token to the second computing device for subsequent transmission to the user authentication service, the signed token and the public key being usable by the user authentication service to determine that the user authentication request is to be granted.

In one embodiment of the foregoing system, the user authentication request comprises a challenge and wherein the approval of the user authentication request includes a user response to the challenge.

In another embodiment of the foregoing system, the first computing device comprises a wearable computing device.

In further accordance with such an embodiment, the wearable computing device comprises a smart watch.

In still a further embodiment of the foregoing system, the wearable computing device is in an unlocked state.

In another embodiment of the foregoing system, the second computing device comprises a smart phone.

In yet another embodiment of the foregoing system, the smart phone is in a locked state.

In still another embodiment of the foregoing system, the first computing device is wirelessly connected to the second computing device via a Bluetooth connection.

In a further embodiment of the foregoing system, the first computing device is wirelessly connected to the second computing device via an IEEE 802.11 connection.

In still another further embodiment of the foregoing system, the value comprises a cryptographic nonce value.

In another embodiment of the foregoing system, the system further comprises the second computing device; wherein the computer program instructions are further executable by the processing circuit to cause the processing circuit to: generate the signing key pair; store the signing key pair in the secure memory; and transmit the public key to the second computing device; and wherein the second computing device is configured to: register the public key with the user authentication service.

In yet another embodiment of the foregoing system, the computer program instructions are further executable by the processing circuit to cause the processing circuit to: generate the signing key pair only if a personal identification code has been enabled for the first computing device.

In yet another embodiment of the foregoing system, the computer program instructions are further executable by the processing circuit to cause the processing circuit to: delete the signing key pair in response to determining that the personal identification code has been disabled for the first computing device.

In yet another embodiment of the foregoing system, the second computing device is configured to register the public key with the user authentication service by: obtaining user authentication input; providing the user authentication input to the user authentication service; receiving a time-limited token from the user authentication service in response to providing the user authentication input; and utilizing the time-limited token to register the public key with the user authentication service.

Another system comprising a first computing device is also described herein, a first computing device, including: a processing circuit; a secure memory connected to the processing circuit, the secure memory storing a personal identification code, the personal identification code being registered with a user authentication service that comprises one or more user authentication servers; a memory connected to the processing circuit, the memory storing computer program instructions, the computer program instructions being executable by the processing circuit to cause the processing circuit to: receive a user authentication request from the user authentication service to which the first computing device is connected; transmit the user authentication request to a second computing device to which the first computing device is wirelessly connected; receive an approval of the user authentication request from the second computing device; and subsequent to receiving the approval of the user authentication request from the second computing device, read the personal identification code from the secure memory and transmit it to the user authentication service, the personal identification code being usable by the user authentication service to determine that the user authentication request is to be granted.

In another embodiment of the foregoing system, the computer program instructions are further executable by the processing circuit to cause the processing circuit to: transmit an authentication details request to the user authentication service in response to receiving the approval of the user authentication request from the second computing device; receive authentication details from the user authentication service, the authentication details indicating that the personal identification code must be provided; and read the personal identification code from the secure memory and transmit it to the user authentication service in response to receiving the authentication details.

In yet another embodiment of the foregoing system, the second computing device comprises a wearable computing device.

In yet another embodiment of the foregoing system, the wearable computing device comprises a smart watch.

In yet another embodiment of the foregoing system, the wearable computing device is in an unlocked state.

In yet another embodiment of the foregoing system, the first computing device comprises a smart phone.

In yet another embodiment of the foregoing system, the smart phone is in a locked state.

In yet another embodiment of the foregoing system, the first computing device is wirelessly connected to the second computing device via a Bluetooth connection.

In yet another embodiment of the foregoing system, the first computing device is wirelessly connected to the second computing device via an IEEE 802.11 connection.

A method in a first computing device that stores a signing key pair that includes a private key and a public key, the public key being registered with a user authentication service that comprises one or more user authentication servers is also described herein. The method comprises receiving, via a second computing device, a user authentication request from the user authentication service, the second computing device being connected to the user authentication service and wirelessly connected to the first computing device; displaying information related to the user authentication request; receiving an approval of the user authentication request; transmitting the approval of the user authentication request to the second computing device; receiving a token from the second computing device, the token comprising a value that was obtained by the second computing device from the user authentication service in response to receiving the approval of the user authentication request; signing the token with the private key to generate a signed token; and providing the signed token to the second computing device for subsequent transmission to the user authentication service, the signed token and the public key being usable by the user authentication service to determine that the user authentication request is to be granted.

In another embodiment of the foregoing method, the user authentication request comprises a challenge and wherein the approval of the user authentication request includes a user response to the challenge.

In yet another embodiment of the foregoing method, the first computing device comprises a wearable computing device.

In yet another embodiment of the foregoing method, the wearable computing device is in an unlocked state.

In yet another embodiment of the foregoing method, the second computing device comprises a smart phone.

In yet another embodiment of the foregoing method, the smart phone is in a locked state.

In yet another embodiment of the foregoing method, the first computing device is wirelessly connected to the second computing device via a Bluetooth connection.

In yet another embodiment of the foregoing method, the first computing device is wirelessly connected to the second computing device via an IEEE 802.11 connection.

In yet another embodiment of the foregoing method, the value comprises a cryptographic nonce value.

In yet another embodiment of the foregoing method, the method further comprises generating the signing key pair; storing the signing key pair in secure memory of the first computing device, and transmitting the public key to the second computing device such that the second computing device can register the public key with the user authentication service.

In yet another embodiment of the foregoing method, generating the signing key pair only if a personal identification code has been enabled for the first computing device.

In yet another embodiment of the foregoing method, deleting the signing key pair in response to determining that the personal identification code has been disabled for the first computing device.

V. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments but should be defined only in accordance with the following claims and their equivalents.

What is claimed is:

1. A system, comprising:
a first computing device, including:
  a processing circuit;
  a secure memory connected to the processing circuit, the secure memory storing a signing key pair that includes a private key and a public key, the public key being registered with a user authentication service that comprises one or more user authentication servers; and
  a memory connected to the processing circuit, the memory storing computer program instructions, the computer program instructions being executable by the processing circuit to cause the processing circuit to:
    receive via a second computing device a user authentication request comprising a challenge from the user authentication service, the second computing device being connected to the user authentication service via one or more networks and wirelessly connected to the first computing device;
    display information related to the user authentication request;
    receive an approval of the user authentication request comprising a user response to the challenge;
    transmit the approval of the user authentication request to the second computing device;
    receive a token from the second computing device, the token comprising a value that was obtained by the second computing device from the user authentication service in response to receiving the approval of the user authentication request;
    sign the token with the private key to generate a signed token; and provide the signed token to the second computing device for subsequent transmission to the user authentication service, the signed token and the public key being usable by the user authentication service to determine that the user authentication request is to be granted.

2. The system of claim 1, further comprising:
the second computing device;
wherein the computer program instructions are further executable by the processing circuit to cause the processing circuit to:
generate the signing key pair;
store the signing key pair in the secure memory; and
transmit the public key to the second computing device; and
wherein the second computing device is configured to:
register the public key with the user authentication service.

3. The system of claim 2, wherein the computer program instructions are further executable by the processing circuit to cause the processing circuit to:
generate the signing key pair only if a personal identification code has been enabled for the first computing device.

4. The system of claim 3, wherein the computer program instructions are further executable by the processing circuit to cause the processing circuit to:
delete the signing key pair in response to determining that the personal identification code has been disabled for the first computing device.

5. The system of claim 2, wherein the second computing device is configured to register the public key with the user authentication service by:
obtaining user authentication input;
providing the user authentication input to the user authentication service;
receiving a time-limited token from the user authentication service in response to providing the user authentication input; and
utilizing the time-limited token to register the public key with the user authentication service.

6. The system of claim 1, wherein the value comprises a cryptographic nonce value.

7. A system, comprising:
a first computing device, including:
a processing circuit;
a secure memory connected to the processing circuit, the secure memory storing a personal identification code, the personal identification code being registered with a user authentication service that comprises one or more user authentication servers;
a memory connected to the processing circuit, the memory storing computer program instructions, the computer program instructions being executable by the processing circuit to cause the processing circuit to:
receive a user authentication request from the user authentication service to which the first computing device is connected via one or more networks;
transmit the user authentication request to a second computing device to which the first computing device is wirelessly connected;
receive an approval of the user authentication request from the second computing device; and
subsequent to receiving the approval of the user authentication request from the second computing device, read the personal identification code from the secure memory and transmit it to the user authentication service, the personal identification code being usable by the user authentication service to determine that the user authentication request is to be granted;
wherein the computer program instructions are further executable by the processing circuit to cause the processing circuit to:
transmit an authentication details request to the user authentication service in response to receiving the approval of the user authentication request from the second computing device;
receive authentication details from the user authentication service, the authentication details indicating that the personal identification code must be provided; and
read the personal identification code from the secure memory and transmit it to the user authentication service in response to receiving the authentication details.

8. The system of claim 7, wherein the second computing device comprises a wearable computing device.

9. The system of claim 8, wherein the wearable computing device comprises a smart watch and the first computing device comprises a smart phone.

10. The system of claim 9, wherein the wearable computing device is in an unlocked state and the smart phone is in a locked state.

11. The system of claim 7, wherein the first computing device is wirelessly connected to the second computing device via a Bluetooth connection or an IEEE 802.11 connection.

12. A method in a first computing device that stores a signing key pair that includes a private key and a public key, the public key being registered with a user authentication service that comprises one or more user authentication servers, the method comprising:
receiving, via a second computing device, a user authentication request from the user authentication service, the second computing device being connected to the user authentication service via one or more networks and wirelessly connected to the first computing device;
displaying information related to the user authentication request;
receiving an approval of the user authentication request;
transmitting the approval of the user authentication request to the second computing device;
receiving a token from the second computing device, the token comprising a value that was obtained by the second computing device from the user authentication service in response to receiving the approval of the user authentication request, the value comprising a cryptographic nonce value;
signing the token with the private key to generate a signed token; and
providing the signed token to the second computing device for subsequent transmission to the user authentication service, the signed token and the public key being usable by the user authentication service to determine that the user authentication request is to be granted.

13. The method of claim 12, wherein the user authentication request comprises a challenge and wherein the approval of the user authentication request includes a user response to the challenge.

14. The method of claim 12, wherein the first computing device comprises a wearable computing device.

15. The method of claim 14, wherein the wearable computing device comprises a smart watch and the second computing device comprises a smart phone.

16. The method of claim 15, wherein the wearable computing device is in an unlocked state and the smart phone is in a locked state.

17. The method of claim 12, further comprising:
generating the signing key pair;
storing the signing key pair in secure memory of the first computing device; and
transmitting the public key to the second computing device such that the second computing device can register the public key with the user authentication service.

18. The method of claim 17, further comprising:
generating the signing key pair only if a personal identification code has been enabled for the first computing device; and
deleting the signing key pair in response to determining that the personal identification code has been disabled for the first computing device.

19. A method in a first computing device that stores a signing key pair that includes a private key and a public key, the public key being registered with a user authentication service that comprises one or more user authentication servers, the method comprising:
receiving, via a second computing device, a user authentication request comprising a challenge from the user authentication service, the second computing device being connected to the user authentication service via one or more networks and wirelessly connected to the first computing device;
displaying information related to the user authentication request;
receiving an approval of the user authentication request comprising a user response to the challenge;
transmitting the approval of the user authentication request to the second computing device;
receiving a token from the second computing device, the token comprising a value that was obtained by the second computing device from the user authentication service in response to receiving the approval of the user authentication request;
signing the token with the private key to generate a signed token; and
providing the signed token to the second computing device for subsequent transmission to the user authentication service, the signed token and the public key being usable by the user authentication service to determine that the user authentication request is to be granted.

20. A method in a first computing device that stores a signing key pair that includes a private key and a public key, the public key being registered with a user authentication service that comprises one or more user authentication servers, the method comprising:
receiving, via a second computing device, a user authentication request from the user authentication service, the second computing device being connected to the user authentication service via one or more networks and wirelessly connected to the first computing device;
displaying information related to the user authentication request;
receiving an approval of the user authentication request;
transmitting the approval of the user authentication request to the second computing device;
receiving a token from the second computing device, the token comprising a value that was obtained by the second computing device from the user authentication service in response to receiving the approval of the user authentication request;
signing the token with the private key to generate a signed token; and
providing the signed token to the second computing device for subsequent transmission to the user authentication service, the signed token and the public key being usable by the user authentication service to determine that the user authentication request is to be granted;
the method further comprising:
generating the signing key pair;
storing the signing key pair in secure memory of the first computing device; and
transmitting the public key to the second computing device such that the second computing device can register the public key with the user authentication service.

* * * * *